Dec. 13, 1966   M. V. DE LANO, JR., ET AL   3,290,891
BATCH CRYSTAL PURIFICATION
Filed May 2, 1963
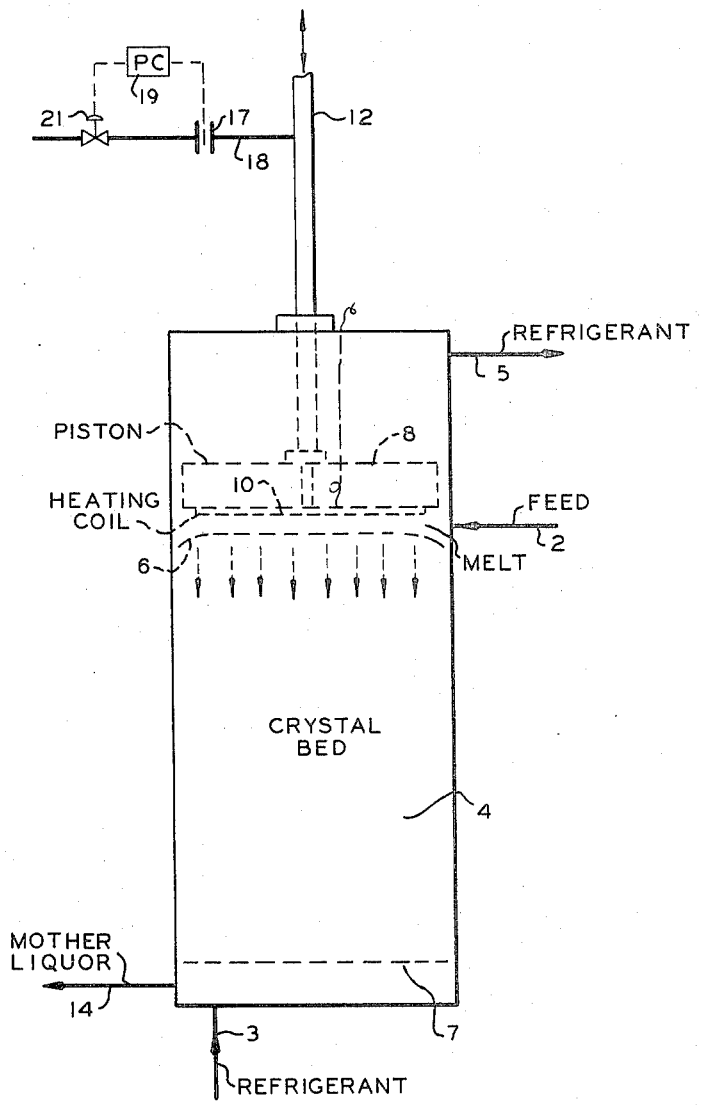
INVENTORS
M.V. DELANO, JR.
D.C. TABLER
BY
*Young and Quigg*
ATTORNEYS

United States Patent Office 3,290,891
Patented Dec. 13, 1966

3,290,891
BATCH CRYSTAL PURIFICATION
Merritt V. De Lano, Jr., and Donald C. Tabler, Bartlesville, Okla., assignors to Phillips Petroleum Company, a corporation of Delaware
Filed May 2, 1963, Ser. No. 277,636
3 Claims. (Cl. 62—58)

This invention relates to the separation of multi-component mixtures. In one aspect the invention relates to the separation and purification of components of a liquid multi-component mixture. In another aspect the invention relates to a method for the transfer of heat in fractional crystallization.

The separation of chemical compounds by means of crystallization finds many applications in industrial installations. While many separations can be made by distillation or solvent extraction, there are instances where these methods are either impractical or impossible and desired separation can be effected more advantageously by means of crystallization. Thus, in the case of chemical isomers having similar boiling points, solubilities, or materials having relatively high boiling ranges or thermally unstable substances, separation by crystallization may be the only method which can be advantageously employed.

As well as often being the only practical method of separation, the crystallization method offers a further advantage of being the only known separation method which in case of eutectic-forming systems, theoretically produces a pure product in a single stage of operation. In actual practice, however, the crystals obtained from a solution of several components will be impure because of the occlusion of mother liquor within the crystal interstices. In the conventional fractional crystallization processes, the crystals yielded from one batch crystallization are redissolved in a solvent or remelted and again recrystallized to effect further purification. The recrystallized product will contain fewer impurities since the concentration of impurities in the new liquor is less than in the previous liquor crystallization.

More recently, a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column, crystals are separated from mother liquor and then introduced into a purification section containing a melting section. The crystals are moved into the purification section toward the melting section where the crystals are melted and a portion of the melt is withdrawn as product. The remainder of the melt is displaced countercurrently to the movement of crystals and in intimate contact therewith so as to remove occluded impurities.

Since the slurry of crystals form a rather compact mass which is moved only with difficulty toward the means for melting, it would be advantageous to have a method and apparatus which will permit the purification of the crystals without the necessity for the movement thereof through a confined vessel.

It is an object of the invention to provide an improved fractional crystallization method.

It is another object of the invention to provide an improved process for the separation of components of multi-component mixtures.

It is another object of the invention to provide an improved process and apparatus for the purification of a bed of crystals.

It is another object of the invention to provide an improved method and apparatus for the transfer of heat to a bed of crystals.

It is another object of the invention to provide an improved method and apparatus for the removal of occluded mother liquor from a bed of crystals.

These and other objects of the invention will be readily apparent to those skilled in the art from the accompanying disclosure, drawings and claims.

These objects are broadly accomplished in a process for the purification of crystals containing occluded mother liquor comprising melting the crystals by moving a source of heat through a bed of crystals to melt said crystals, maintaining the surface of the bed of crystals under pressure so as to force a portion of the resultant melt into the surface as reflux and withdrawing the remainder of the melt from said zone.

In one embodiment, the melt is withdrawn when the pressure on said surface exceeds a predetermined value.

The process and apparatus described herein can be advantageously employed in conjunction with practically any system to which fractional crystallization is applicable. For simplification, the invention is described herein primarily with reference to an aqueous mixture. However, the process and apparatus of the invention are applicable to a vast number of simple binary and complex multi-component systems. The invention is particularly applicable to the separation of hydrocarbons which have practically the same boiling point and are, therefore, difficult to separate by distillation. The invention is broadly applicable to the purification of any liquid such as those described in the patent to Rosswell W. Thomas, U.S. 2,854,494, which is incorporated as a reference herein.

For a more complete understanding of the invention, reference is now made to the following description and the drawing which is an elevational view of an illustrative fractional crystallization apparatus suitable for practice of the invention.

The drawing illustrates diagrammatically a simple confined vessel 4 into which is introduced through conduit 2 a feed mixture containing at least one component which is crystallizable by cooling. The liquid mixture may be partially crystallized prior to introduction into the purification zone 4 and then further cooled in the vessel, or the feed may be fed into the purification column 4 as a liquid mixture and subsequently frozen to form a slurry of crystals in mother liquor. This cooling may be accomplished by any suitable means, such as by the passing of a refrigerant liquid through conduit 3, vaporized in the crystal bed and passed out through conduit 5. At this stage the piston 8 is in the extreme upper portion of the vessel so the vapor can be withdrawn through conduit 5 and so a maximum amount of refrigerant can be introduced into the vessel in direct heat exchange with the liquid mixture or by indirect heat exchange (not shown). Once the crystal bed has been formed piston 8 is moved against the crystal bed interface 6 by movement of shaft 12 longitudinally by a source of power, not shown. Preferably, the piston 8 is not heated at this stage and since it is closely fitting against the interior of the purification column and has essentially the same configuration and area as the interior cross-section of said column, the piston compacts the crystal bed and forces mother liquor from the crystal bed through a filter 7 and out through conduit 14. Although the apparatus is shown in a vertical position, it is believed obvious that the invention is applicable to the positioning of the purification column in any position, including vertical, horizontal and inclined. After the crystal bed has been compacted to remove substantially all of the mother liquor, heat is applied to the surface of the piston by means of a heating coil 10 which serves to melt the surface of the crystal bed. Any type of heating means may be employed and it is also possible to heat the entire piston rather than merely the surface thereof, although this would not normally be considered the most economical method. Preferably, the coil is heated by refrigerant vapor from a companion unit. During the heating of the piston, the piston continues its movement toward the discharge end, thereby forcing at least a portion of the melt trapped between said surface and said piston into the surface of the crystal bed as reflux to further purify the crystals. The remainder of the crystal melt not needed for reflux is removed through a passageway or passageways through the face of the piston 8 through a channel and out from the system through an opening in the interior of the shaft 12 and through conduit 18. It is within the scope of the invention to employ a number of passageways and it is not necessary that the melt be removed through the shaft but instead the melt can be removed from the end portion of the purification column. The amount of melt withdrawn can be controlled so as to maintain a back pressure since it is only necessary to have sufficient pressure to result in refluxing of a small portion of the melt into the crystal bed surface. A valve 21 is positioned in conduit 18 so that when the pressure as determined by sensing means 17 exceeds a predetermined value, for example, 50 pounds per square inch, a signal would be transmitted by pressure control 19 to open valve 21. Preferably, a pressure differential of 2 to 100 p.s.i. is maintained between the piston pressure and the back pressure. A simple piston is shown in the drawing. However, any type of close fitting heating means which will apply a pressure to the crystal surface may be employed. For example, the piston can be composed of two parts with the first surface being a porous piston having a heating means attached thereto through which the melt flows and is trapped by a second close fitting piston with the liquid being removed through a passageway in the shaft when the pressure exceeds a predetermined value as hereinbefore described. In addition, for more efficient refluxing, it may be desirable to pulse the pressure applied to the surface by methods such as described in U.S. Patent 2,854,494 to Rosswell W. Thomas. The melting zone is maintained at a temperature at least as high as the melting point of the crystals, for example, in the case of beer, this temperature is in the range of 35° F. to 100° F.

When the crystal bed has been completely melted, the piston is moved back toward the original end and a new charge of slurry or feed mixture is placed into the tank.

By the method of this invention, the problem of channeling of a wash fluid being passed through a crystal bed in a batch operation is solved since by moving the entire melting unit through the stationary crystal bed, all of the crystals are thus subjected to reflux liquid.

A more comprehensive understanding of the invention may be obtained by reference to the following illustrative example.

*Example*

A feed comprising 20,000 gallons of sea water containing 3 weight percent salt is passed into a vertical, cylindrical vessel 10 feet in diameter and 50 feet in height. Liquid propane is sparged into the bottom of the vessel and allowed to vaporize therein until 75 percent of the water has frozen. Propane vapor is removed from the top of the vessel, compressed to 100 p.s.i.a. and 100° F., and passed through the melter unit in a companion purification unit. This freezing step requires 25,000 gallons of liquid propane. A piston 10 feet in diameter and equipped with a tightly wound, pancake coil of tubing on the crystal bed side is then moved downwardly onto the bed of crystals from the top of the vessel. By means of a hydraulic cylinder, a pressure of 60 pounds p.s.i.g. is exerted on the top of the crystal bed. The piston moves downward, compacting the bed, and pressing out some mother liquor. When the piston movement stops, hot gaseous propane at 100° F. and 100 p.s.i.a. from the companion unit is passed through the heater coil. Melting of the crystals then begins with the melt accumulating below the piston and filling the withdrawal pipe. When pressure of the melt reaches 50 p.s.i.g., the melt is withdrawn. As melting continues, the piston moves downwardly in contact with the top of the crystal bed. Mother liquor issues from the bottom of the bed and is separately stored as salt concentrate or waste. When the piston reaches the bottom of the tank (crystals all melted), 14,500 gallons of melt containing less than 500 p.p.m. salt have been recovered together with 5,500 gallons of mother liquor containing 11 percent salt. The cycle is then repeated.

While certain examples, structures, composition and process steps have been described for purposes of illustration, the invention is not limited to these. Variation and modification within the scope of the disclosure and claims can readily be effected by those skilled in the art.

We claim:

1. A batch process for the separation of at least one component from a liquid mixture comprising cooling said liquid in an elongate confined batch cooling zone to form a bed of crystals, melting said crystals to form a melt by the movement of a heated piston against one surface of said crystal bed, maintaining intimate contact between said piston and the melt trapped between said piston and said surface, moving said piston toward the opposite end portion of said crystal bed without moving said bed as said surface melts, said piston forcing a portion of said melt into the surface as reflux, removing adherent mother liquor from said opposite end portion of said zone, permitting the remainder of said melt to pass through at least one passageway in said piston and withdrawing said remainder of the melt from said zone.

2. The process of claim 1 wherein the melt is withdrawn when the pressure on said melt exceeds a predetermined value.

3. Apparatus for the separation of at least one component from a liquid mixture comprising an elongated confined vessel, a first outlet means positioned in the first end portion of said vessel, a close fitting piston positioned in the interior of said vessel having the same configuration and area as the interior cross-section of said vessel, heating means for heating said piston, an inlet means for introducing a feed mixture into said vessel intermediate said piston and said first outlet, cooling means for cooling the interior of said vessel to form a slurry of crystals, means for longitudinally moving said piston toward said first outlet end thus applying heat and pressure to the surface of said crystals, at least one passageway through said piston establishing communication between said first end portion and the opposite end portion of said vessel, and a second outlet means for removal of melt in communication with said opposite end portion.

References Cited by the Examiner
UNITED STATES PATENTS

| | | | |
|---|---|---|---|
| 2,770,533 | 11/1956 | Kahmann et al. | 23—273 |
| 3,023,090 | 2/1962 | Kolner | 23—273 |
| 3,092,673 | 6/1963 | Rush | 260—674 |
| 3,190,450 | 6/1965 | Stoller et al. | 210—71 X |

REUBEN FRIEDMAN, *Primary Examiner.*

SAMIH N. ZARHARNA, *Examiner.*